Nov. 1, 1932.  P. MARTIN  1,885,746

POWER TRANSMISSION MECHANISM

Filed Jan. 5, 1931  3 Sheets-Sheet 1

INVENTOR
Percy Martin
BY
Gill + Jennings
ATTORNEYS

Nov. 1, 1932. P. MARTIN 1,885,746
POWER TRANSMISSION MECHANISM
Filed Jan. 5, 1931 3 Sheets-Sheet 3

Patented Nov. 1, 1932

1,885,746

UNITED STATES PATENT OFFICE

PERCY MARTIN, OF COVENTRY, ENGLAND, ASSIGNOR TO THE DAIMLER COMPANY LIMITED, OF COVENTRY, WARWICKSHIRE, ENGLAND, A BRITISH COMPANY

POWER TRANSMISSION MECHANISM

Application filed January 5, 1931, Serial No. 506,814, and in Great Britain May 2, 1930.

This invention relates to systems of power transmission embodying variable speed gearing and is particularly concerned with power transmission mechanism for automobile vehicles.

In the prior art, the advantages of gearing of the planetary or epicyclic type controlled by brake bands, shoes or other members having the function of controlling the rotation of the respective elements of such a gearing have been well appreciated, and, in particular, the advantage that the use of such a gearing eliminates the ordinary speed-changing operations which are commonly carried out by means of a change-speed lever actuating the elements of a speed gearing in conjunction with a pedal operated clutch. It has also been recognized in the prior art that such an epicyclic gearing has certain disadvantages. Thus the brakes acting on the drums of the gearing or the members having the equivalent function have had to carry out the work of the pedal operated clutch. This has given rise to unsatisfactory operation in particular due to the wear which ensues between the brake bands and their drums; if it be sought to reduce this wear by giving the friction surface between the said bands and the brake drums a fiercer action, jerks in speed changing are apt to result. It is the principal purpose of the present invention to provide a new or improved power transmission system particularly for motor driven vehicles which avoids the previous drawbacks in the use of epicyclic gearing and renders the use of such gearing a practical proposition.

The object of the present invention comprises a planetary or epicyclic toothed gearing constructed to provide a number of speed ratios and of the type arranged to be controlled by brake bands, shoes or the like for controlling the rotation of the respective elements of the gearing, in combination with a hydraulic coupling of the fluid flywheel type having its primary or driven member in positive driving relation with the prime mover, that is to say, the engine of the vehicle and having its secondary or output member in driving relation with the planetary or epicyclic gearing, the arrangement being such that the slip in the hydraulic coupling is interposed in the transmission line under all conditions of starting and running.

The provision of an independent clutch operated by a clutch pedal or equivalent and interposed between the engine and said gearing is as a result rendered unnecessary. The novel system does not employ such a pedal operated clutch as the braking members of the gearing can be designed to carry out all the speed-changing operations without any risk of jerks becoming manifest as any possible jerks or shocks are entirely absorbed by the hydraulic coupling. The hydraulic coupling employed is of the fluid flywheel type as hereinbefore stated, that is to say, it is a coupling consisting essentially of two elements, one power driven or primary vane wheel and a secondary vane wheel transmitting the drive and so arranged that the sole connection between the primary and secondary elements is constituted by the fluid circulating in a closed circuit under a difference of pressure or head maintained by centrifugal action due to the rotation of said primary member.

By employing the novel transmission system, epicyclic or planetary gearing of the type hereinbefore referred to may be employed in an entirely satisfactory manner and the transmission system has at the same time further advantages due to the hydraulic coupling. For instance, a motor driven vehicle fitted with the novel transmission system is capable of being started on any speed ratio because the drive is taken up through the hydraulic coupling as the engine is accelerated. Moreover the drive may be taken up on any speed ratio at any speed of the vehicle and sudden changes in the speed ratio may be made in a manner not possible without incorporating a hydraulic coupling.

An embodiment of the novel transmission system is illustrated in the annexed drawings in which:—

Figure 1:
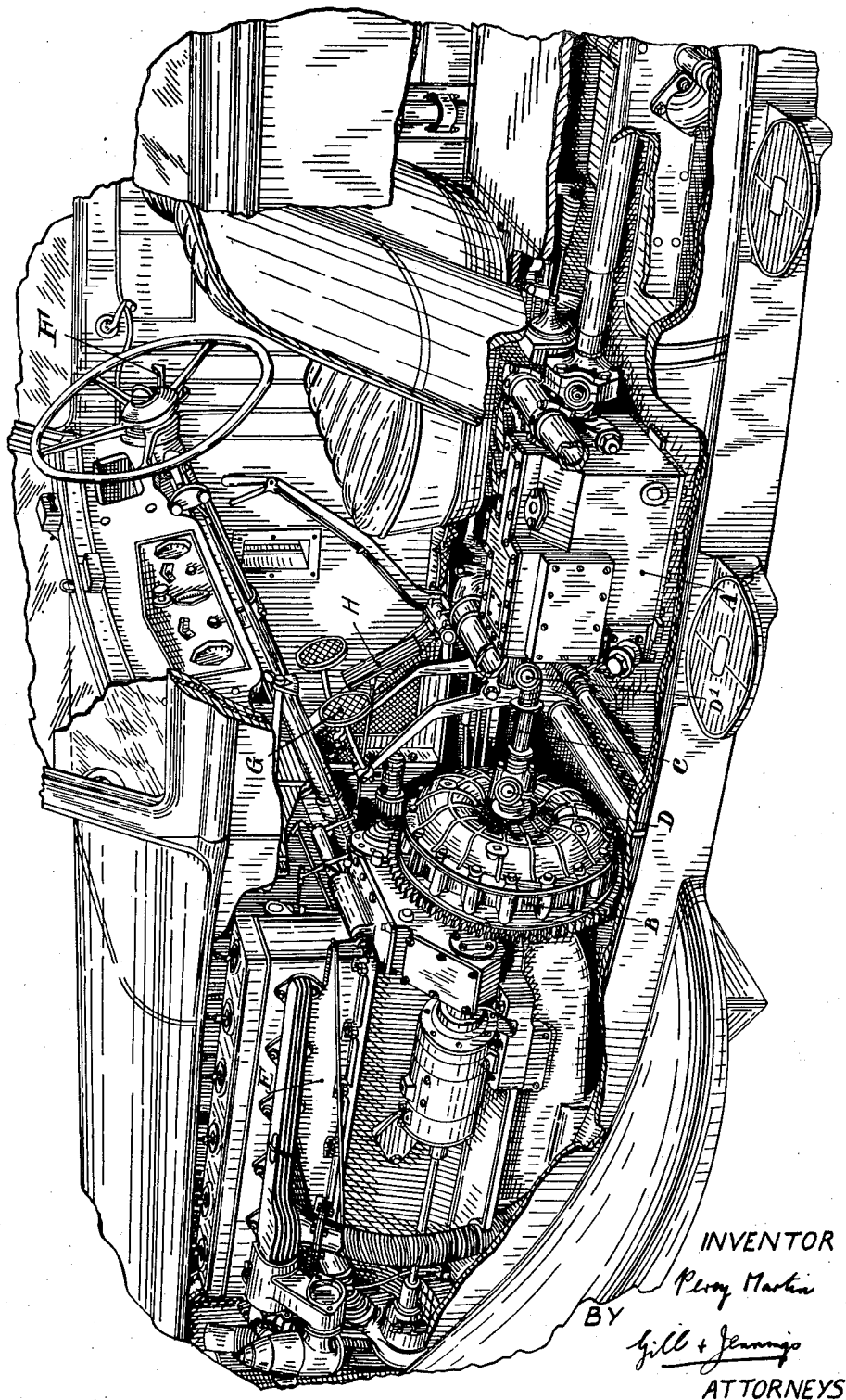
Figure 1 is a perspective view of a motor car fitted with the novel transmission mechanism, and shows sufficient of the car to illustrate the essential parts of the transmission.

In the general view in Figure 1, the planetary or epicyclic gear box is seen at A. The hydraulic coupling of the fluid flywheel type is seen at B connected to a short shaft C with universal joints D and $D^1$ at either end. The car engine is shown at E, the hydraulic coupling B being interposed between the engine shaft and the gear box A. The pre-selector lever which is set into the position for the gear desired, is seen at F, and the pedal for engaging the fresh gear ratio is shown at G.

Figure 2:
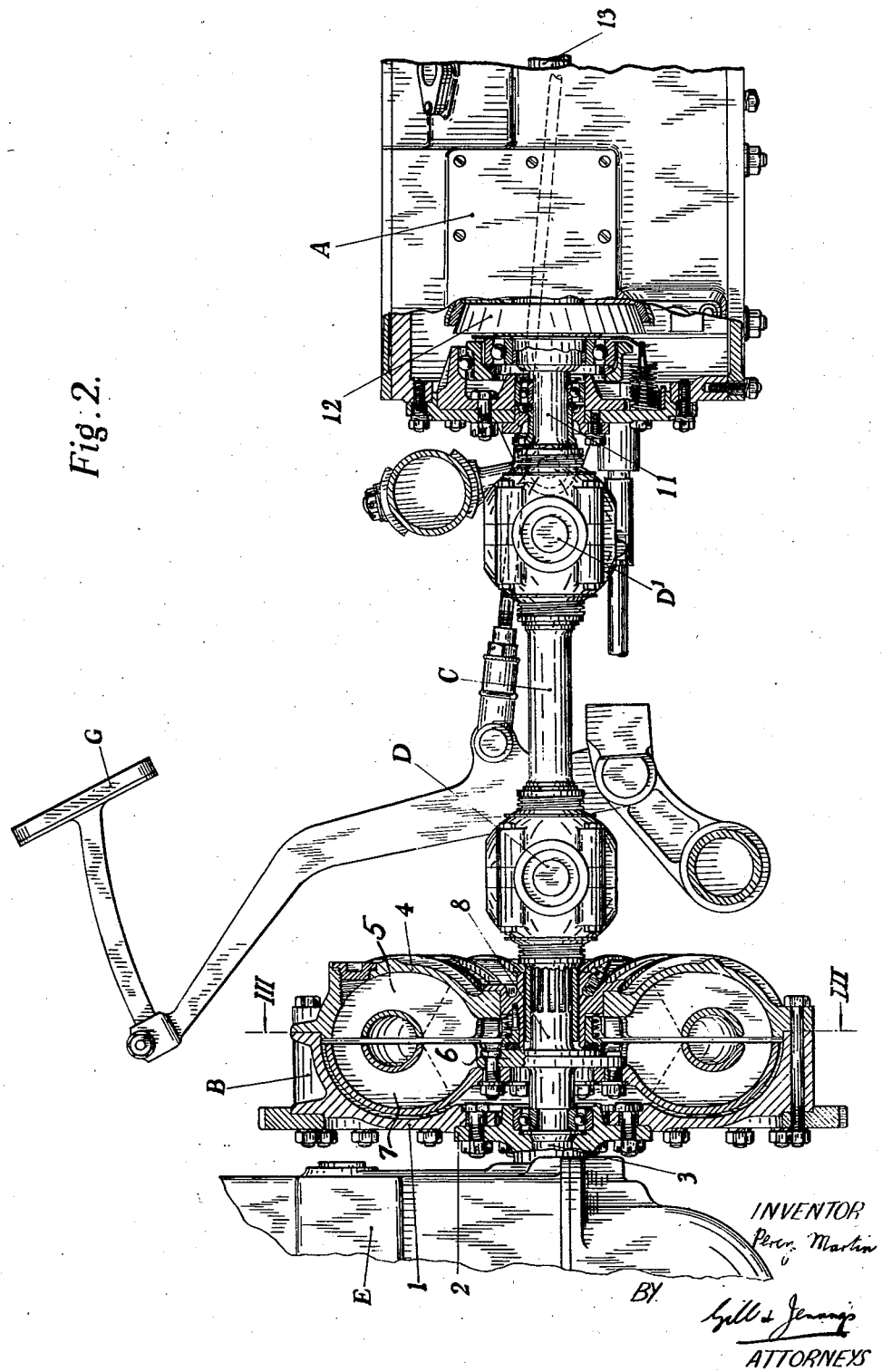
Figure 2 is a side elevation showing the fluid flywheel and its connections to the gear box, the flywheel being in section on the line II—II of Figure 3, while the forward portion of the gear box casing is shown broken away.

The connections between the various elements are better seen in Figure 2, where the same reference characters have been employed as in Figure 1.

The primary member of the hydraulic coupling or fluid flywheel B is connected directly to, and driven from the engine E. The primary member consists of the external casing 1 bolted to a flange 2 integral with the engine shaft 3. The right-hand half 4 of the casing of the primary member carries the blades 5 which form the primary driving element. The secondary or driven member of the coupling consists of a boss 6 carrying the secondary blades 7. The shaft 8 of the secondary member is journalled within the central part of the casing 4, and is directly connected to one side of the universal coupling D.

Figure 3:
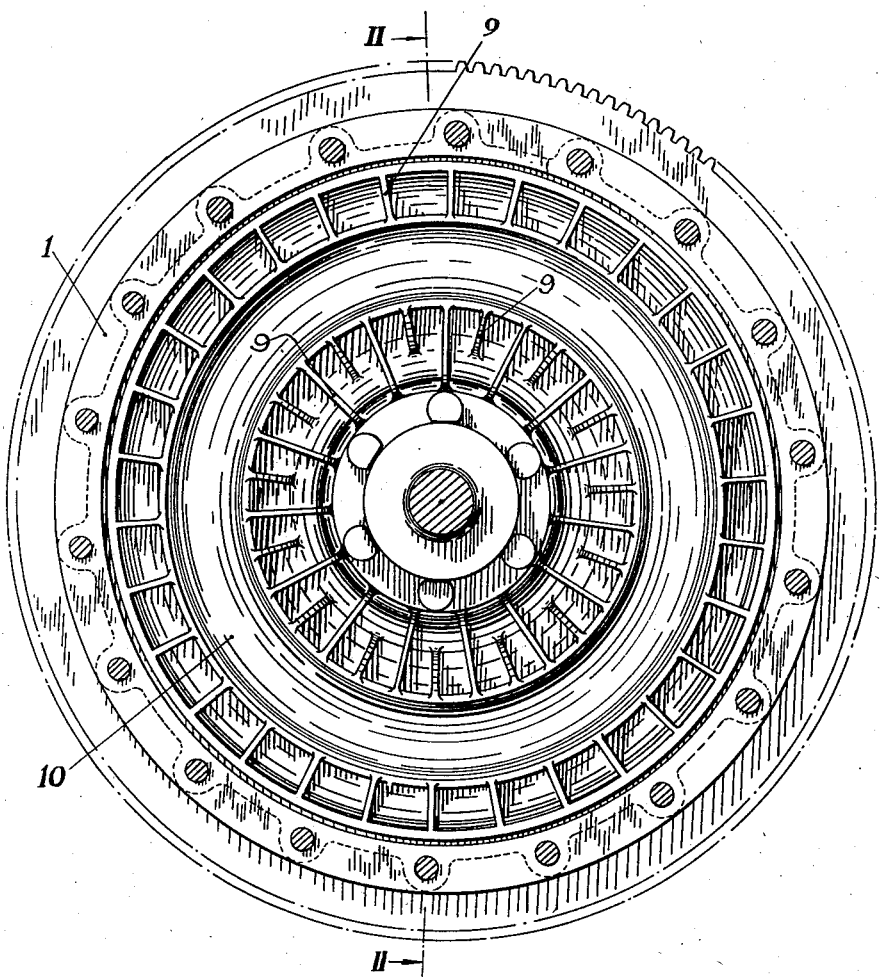
Figure 3 is a transverse section of the fluid flywheel on the line III—III in Figure 2.

The internal construction of the coupling is seen in Figure 3, which is a section through the casing 1. The radial webs 9 of the blades 7 of the secondary or driven member are clearly shown in the figure. The driving member has similar radial blades or veins 5 as above noted. Each set of blades supports an annular member semi-circular in cross section and indicated at 10 in the drawings. These two annular members face one another and constitute a two-part toric core. This annular toric space performs no function other than it creates an annular passage which surrounds the toric core. Assume the driven member to be stationary and the driving member to be rotated, the oil between the blades 5 on the righthand side of the dividing plane as viewed in Fig. 2, will be thrown outwards by centrifugal force and therefore circulation will be set up around the core 10 in the direction of the arrows shown in Fig. 2. As the oil leaves the edges of the blades 5 on the outer side of the core, it will strike the blades 7 owing to the fact that it is being carried around with the driving member and therefore will tend to drive the driven member in the same direction. The force applied to the driven member will be proportional to the difference in speed between the two members. The oil in passing from the edges of the blades 7 into the space between the blades 5 will of course exert a backward reaction, but this is much less in amount than the forward reaction on the outer side of the core because the cross section of the passage is greater as shown in Fig. 2 and therefore the velocity of the oil is less. Moreover this backward reaction is exerted at a smaller radius than the forward reaction and consequently there is a net forward driving tendency.

At low engine speeds, the primary member is driven at a slow speed and is able to slip through the liquid filling the casing of the hydraulic coupling B. No power is transmitted to the secondary member, which is held stationary whenever the car is in gear, and as a matter of fact, on the level the car can be started slowly and gently without jerks in any gear merely by pressing the accelerator pedal H (see Figure 1), and thereby increasing the engine speed.

The intermediate shaft C is connected between the universal joints D and $D^1$, and the latter at its right-hand end as seen in Figure 2 is connected to the input member of the epicyclic gear box A.

This gear box is of the epicyclic toothed gearing type providing a number of speed ratios, and is controlled by braking members, such as brake bands, controlling the rotation of the respective elements of the gearing. The form of gear box illustrated in the drawings, purely by way of example, however, is of the type set forth in the specification of United States Patent No. 1,404,675, the input shaft 11 corresponding to the shaft $a$ in the said patent specification, and the clutch 12 being the clutch engaged for connecting direct drive for the highest speed. As in the specification of United States Patent No. 1,404,675, braking bands are provided for engaging the first, second and third speeds, and also for engaging the reverse. The means for operating the gear box and pre-selecting the gear ratios is of generally known design, the pre-selector lever F being connected through rods and bell-cranks to a shaft bearing cams which interpose one of a number of thrust rods into the path of a toggle mechanism, depending upon the position into which the cam shaft is set by the pre-selector lever F. The operation of the gear-engaging pedal G compresses a spring on the downward stroke and on the return stroke effects a coupling through the thrust rod selected to tighten the brake band corresponding to the speed ratio chosen. It is not necessary to describe such gear more fully or to illustrate the same as operating gear of this class is set forth in patent specification of W. G. Wilson, for example, in the specification of British Patent No. 328,660. The output shaft from the gear box A drives the Cardan shaft 13 geared in the ordinary way to the rear wheels of the vehicle.

It is important to notice, however, that the slip of the hydraulic coupling B is interposed in the transmission line under all conditions of starting and running, while no independent clutch operated by a clutch pedal is interposed between the engine E and the gearing A. Such a pedal operated clutch is quite unnecessary in the system illustrated, for the brake bands of the gear box A carry out all gear-changing operations without any risk of jerks as any such jerks are entirely absorbed by the hydraulic coupling B.

It has already been pointed out that the vehicle is capable of being started in any gear ratio, for as the engine is accelerated, the drive is taken up through the hydraulic coupling. Moreover, the drive can be taken up at any speed on any gear ratio, and sudden changes in the gear ratio may be made in a manner not possible without the incorporation of the hydraulic coupling B.

I claim:—

1. A power transmission system comprising in combination a variable speed prime mover, a hydraulic coupling of the fluid flywheel type embodying a primary driven member at all times in positive driving relation with said prime mover and a secondary or output member, a planetary or epicyclic toothed gearing of the type set forth connected to said output member, and a driven shaft connected to said gearing, said members providing between them a chamber for a fluid serving as the sole connection between said members for all driving conditions and operating by centrifugal action at high speeds of either or both said members to restrict the slippage between said members.

2. A power transmission system comprising in combination a variable speed prime mover, a hydraulic coupling of the fluid flywheel type embodying a primary driven member at all times in positive driving relation with said prime mover and a secondary or output member, a planetary or epicyclic toothed gearing of the type set forth connected to said output member, and a driven shaft connected to said gearing, said members providing between them a closed circuit existing partly in one said member and partly in the other member in which a fluid serving as the sole connection between said members for all driving conditions may circulate under a difference in pressure created by centrifugal action due to the rotation of said members so that the slippage between said members is interposed in the transmission line under all conditions of starting and running.

3. A power transmission system for a vehicle having a driving motor and wheels, comprising in combination, a hydraulic coupling embodying a primary driven member in positive driving relation with the motor of the vehicle and a secondary or output member, said primary driven member and said secondary member being provided with means at all times moving with said members and forming a closed circuit in which a fluid serving as the sole connection between said primary and secondary members may circulate under a difference in pressure created by centrifugal action on the fluid due to the rotation of said members, a planetary or epicyclic toothed gearing of the type set forth connected at all times in driving relation with the said secondary member, and means for coupling said gearing to wheels of the vehicle.

4. A power transmission system for a vehicle having a driving motor and wheels, comprising in combination, a hydraulic coupling of the fluid flywheel type embodying a driven primary member in positive driving relation with the motor of the vehicle and a secondary or output member, said primary driven member and said secondary member being provided with means at all times moving with said members and forming a closed circuit in which a fluid serving as the sole connection between said primary and secondary members circulates under a difference in pressure maintained by centrifugal action on the fluid due to the rotation of the primary members, a planetary or epicyclic gearing of the type set forth arranged to provide a number of speed ratios and means for quickly changing from one ratio to another and in driving relation with said secondary member so that the slip of the hydraulic coupling is interposed in the transmission line under all conditions of starting, ratio-changing, and running, and a pre-selector mechanism associated with said gearing for controlling the changes in the speed ratio of the transmission system, and a shaft in driving relation with said gearing and with wheels of said vehicle.

In witness whereof I hereunto subscribe my name this sixth day of December, 1930.

PERCY MARTIN.